United States Patent
Chaudhry et al.

(10) Patent No.: US 7,257,699 B2
(45) Date of Patent: Aug. 14, 2007

(54) SELECTIVE EXECUTION OF DEFERRED INSTRUCTIONS IN A PROCESSOR THAT SUPPORTS SPECULATIVE EXECUTION

(75) Inventors: Shailender Chaudhry, San Francisco, CA (US); Paul Caprioli, Mountain View, CA (US); Marc Tremblay, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 363 days.

(21) Appl. No.: 11/058,522

(22) Filed: Feb. 14, 2005

(65) Prior Publication Data

US 2006/0010309 A1 Jan. 12, 2006

Related U.S. Application Data

(60) Provisional application No. 60/586,587, filed on Jul. 8, 2004.

(51) Int. Cl.
*G06F 9/32* (2006.01)
*G06F 9/38* (2006.01)

(52) U.S. Cl. .................................................. 712/219
(58) Field of Classification Search ................ 712/235, 712/217, 219, 225, 228
See application file for complete search history.

(56) References Cited

U.S. PATENT DOCUMENTS

| | | | |
|---|---|---|---|
| 6,336,168 B1 * | 1/2002 | Frederick et al. ........... 711/141 |
| 6,385,715 B1 * | 5/2002 | Merchant et al. ........... 712/219 |
| 6,775,756 B1 * | 8/2004 | Thusoo et al. .............. 711/169 |
| 6,918,030 B2 * | 7/2005 | Johnson ...................... 712/225 |
| 6,965,987 B2 * | 11/2005 | Senter Brashears et al. 712/245 |
| 7,159,154 B2 * | 1/2007 | Lee et al. ..................... 714/49 |

* cited by examiner

*Primary Examiner*—Eric Coleman
(74) *Attorney, Agent, or Firm*—Park, Vaughan & Fleming LLP

(57) ABSTRACT

One embodiment of the present invention provides a system which selectively executes deferred instructions following a return of a long-latency operation in a processor that supports speculative-execution. During normal-execution mode, the processor issues instructions for execution in program order. When the processor encounters a long-latency operation, such as a load miss, the processor records the long-latency operation in a long-latency scoreboard, wherein each entry in the long-latency scoreboard includes a deferred buffer start index. Upon encountering an unresolved data dependency during execution of an instruction, the processor performs a checkpointing operation and executes subsequent instructions in an execute-ahead mode, wherein instructions that cannot be executed because of the unresolved data dependency are deferred into a deferred buffer, and wherein other non-deferred instructions are executed in program order. Upon encountering a deferred instruction that depends on a long-latency operation within the long-latency scoreboard, the processor updates a deferred buffer start index associated with the long-latency operation to point to position in the deferred buffer occupied by the deferred instruction. When a long-latency operation returns, the processor executes instructions in the deferred buffer starting at the deferred buffer start index for the returning long-latency operation.

21 Claims, 5 Drawing Sheets

SELECTIVE EXECUTION OF DEFERRED INSTRUCTIONS IN A PROCESSOR THAT SUPPORTS SPECULATIVE EXECUTION

RELATED APPLICATION

This application hereby claims priority under 35 U.S.C. §119 to U.S. Provisional Patent Application No. 60/586,587 filed 8 Jul. 2004, entitled "Selective Execution of Deferred Instructions in a Processor that Supports Speculative Execution," by the same inventors as the instant application.

FIELD OF THE INVENTION

The present invention relates to techniques for improving computer system performance. More specifically, the present invention relates to a method and an apparatus for selectively executing deferred instructions following a return from a long-latency operation, such as a load operation.

RELATED ART

Advances in semiconductor fabrication technology have given rise to dramatic increases in microprocessor clock speeds. This increase in microprocessor clock speeds has not been matched by a corresponding increase in memory access speeds. Hence, the disparity between microprocessor clock speeds and memory access speeds continues to grow, and is beginning to create significant performance problems. Execution profiles for fast microprocessor systems show that a large fraction of execution time is spent not within the microprocessor core, but within memory structures outside of the microprocessor core. This means that the microprocessor systems spend a large fraction of time waiting for memory references to complete instead of performing computational operations.

Efficient caching schemes can help reduce the number of memory accesses that are performed. However, when a memory reference, such as a load operation generates a cache miss, the subsequent access to level-two (L2) cache or memory can require dozens or hundreds of clock cycles to complete, during which time the processor is typically idle, performing no useful work.

To prevent costly memory access stalls, some processor designers have proposed entering an "execute-ahead" mode, wherein instructions that cannot be executed because of unresolved data dependencies are deferred, and wherein other non-deferred instructions are executed in program order. When an unresolved data dependency is ultimately resolved during execute-ahead mode, the system executes deferred instructions in a deferred-execution mode, wherein deferred instructions that able to be executed are executed in program order, and wherein other deferred instructions that still cannot be executed because of unresolved data dependencies are re-deferred. For example, see U.S. patent application Ser. No. 10/686,061, filed 14 Oct. 2003, entitled, "Selectively Deferring the Execution of Instructions with Unresolved Data Dependencies as They Are Issued in Program Order," by inventors Shailender Chaudhry and Marc Tremblay (Attorney Docket No. SUN04-0182-MEG).

The processor enters deferred-execution mode from execute-ahead mode upon receiving a 'data return' signal from the memory system. The data return signal gives notice to the processor that a load that originally missed in the L1 data cache has returned from remote memory. Upon entering deferred-execution mode, the processor begins to execute instructions in order from the start of the deferred buffer. Since the deferred buffer can hold a very large number of instructions with many different dependencies, instructions that actually depend on the returning load may be deep in the deferred buffer. The processor can therefore execute hundreds of instructions before encountering the first instruction that is dependent on the returned data. All of the preceding instructions with unresolved data dependencies must be re-deferred by the processor. The attempted execution and subsequent re-deferral of these preceding instructions in the deferred buffer with unresolved data dependencies is a waste of valuable processor resources.

Hence, what is needed is a method and an apparatus for selectively executing deferred instructions when a long-latency operation, such as a load miss, returns.

SUMMARY

One embodiment of the present invention provides a system which selectively executes deferred instructions following a return of a long-latency operation in a processor that supports speculative-execution. During normal-execution mode, the processor issues instructions for execution in program order. When the processor encounters a long-latency operation, such as a load miss, the processor records the long-latency operation in a long-latency scoreboard, wherein each entry in the long-latency scoreboard includes a deferred buffer start index. Upon encountering an unresolved data dependency during execution of an instruction, the processor performs a checkpointing operation and executes subsequent instructions in an execute-ahead mode, wherein instructions that cannot be executed because of the unresolved data dependency are deferred into a deferred buffer, and wherein other non-deferred instructions are executed in program order. Upon encountering a deferred instruction that depends on a long-latency operation within the long-latency scoreboard, the processor updates a deferred buffer start index associated with the long-latency operation to point to position in the deferred buffer occupied by the deferred instruction. When a long-latency operation returns, the processor executes instructions in the deferred buffer starting at the deferred buffer start index for the returning long-latency operation.

In a variation of this embodiment, the processor initializes the deferred buffer start index associated with each entry in the long-latency scoreboard to a highest possible value.

In a variation of this embodiment, the processor updates the value for the deferred buffer start index for a long-latency operation in the long-latency scoreboard when the processor stores a dependent instruction in the deferred buffer in a position closer to the start of the deferred buffer than the existing value for the deferred buffer start index indicates.

In a variation of this embodiment, the method further comprises performing a content addressable memory (CAM) lookup in the long-latency scoreboard to identify long-latency operations for one or more operands required by the deferred instruction.

In a variation of this embodiment, when instructions are re-deferred, the method further comprises performing a CAM lookup in the long-latency scoreboard to identify long-latency operations for one or more operands required by the deferred instruction and, if necessary, updating the deferred buffer start index for these instructions.

In a variation of this embodiment, the processor re-defers instructions in the deferred buffer starting at the location specified by the deferred buffer start index.

In a variation of this embodiment, the processor maintains a deferred instruction counter which indicates where in the deferred buffer the last deferred instruction was stored.

In a variation of this embodiment, when the processor begins execution of deferred instructions following the return of a long-latency operation, the deferred instruction counter is reset to the position of the deferred buffer start index associated with the long-latency operation.

In a variation of this embodiment, executing deferred instructions in the deferred mode involves: issuing deferred instructions for execution in program order; deferring execution of deferred instructions that still cannot be executed because of unresolved data dependencies; and executing other deferred instructions that are able to be executed in program order.

In a variation of this embodiment, if some deferred instructions are deferred again, the processor returns to execute-ahead mode at the point where execute-ahead mode left off.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Processor

Figure 1:
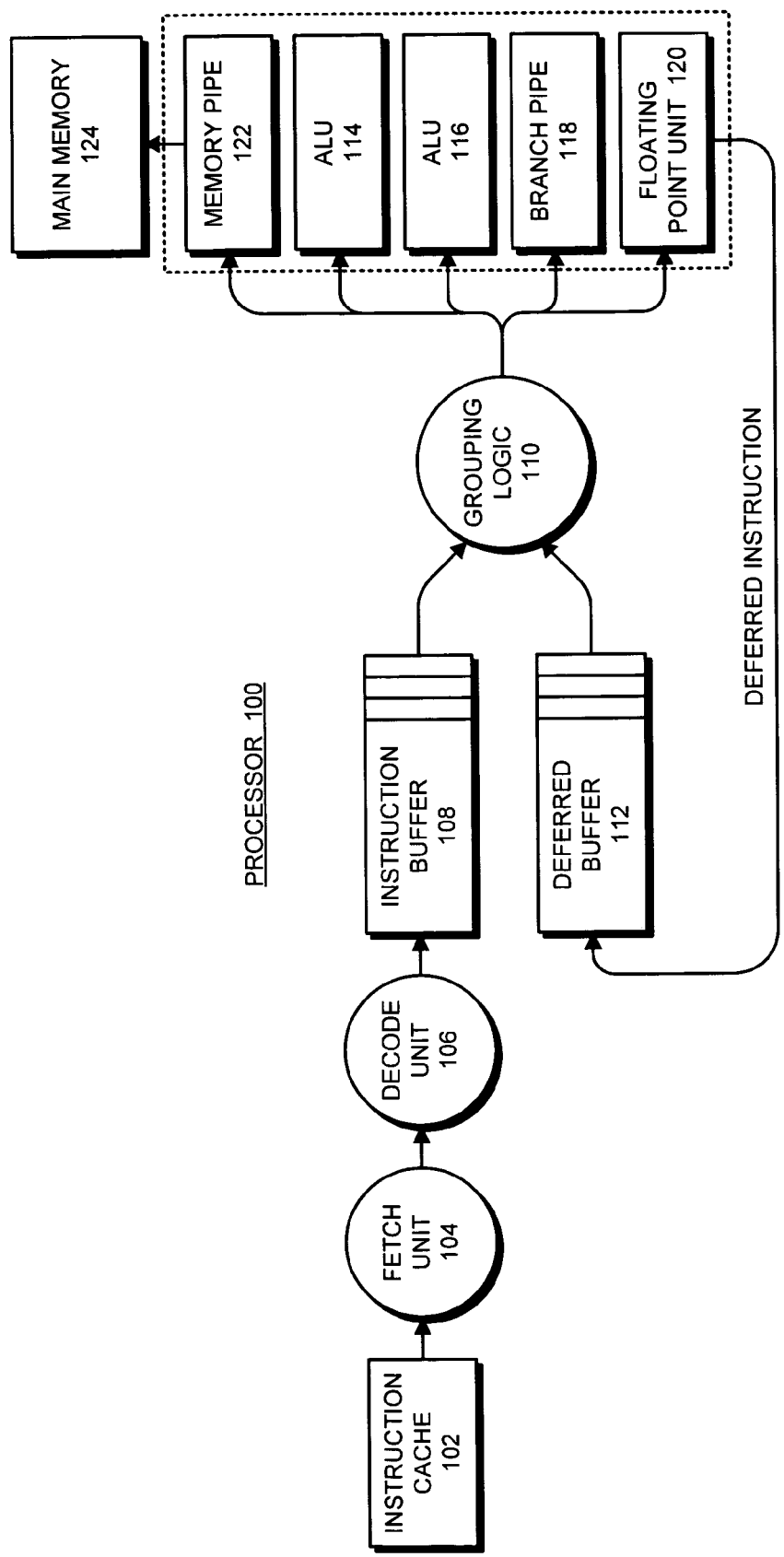
FIG. 1 illustrates the design of a processor in accordance with an embodiment of the present invention.

FIG. 1 illustrates the design of a processor 100 in accordance with an embodiment of the present invention. Processor 100 can generally include any type of processor, including, but not limited to, a microprocessor, a mainframe computer, a digital signal processor, a personal organizer, a device controller, and a computational engine within an appliance. As is illustrated in FIG. 1, processor 100 includes instruction cache 102, fetch unit 104, decode unit 106, instruction buffer 108, deferred buffer 112, grouping logic 110, memory 124, arithmetic logic unit (ALU) 114, ALU 116, branch pipe 118, and floating point unit 120.

During operation, fetch unit 104 retrieves instructions to be executed from instruction cache 102, and feeds these instructions into decode unit 106. Decode unit 106 forwards the instructions to be executed into instruction buffer 108, which is organized as a FIFO buffer. Instruction buffer 108 feeds instructions in program order into grouping logic 110, which groups instructions together and sends them to execution units, including memory pipe 122 (for accessing memory 124), ALU 114, ALU 116, branch pipe 118 (which resolves conditional branch computations), and floating point unit 120.

If an instruction cannot be executed due to an unresolved data dependency, such as an operand that has not returned from a long-latency operation operation, the processor defers execution of the instruction and moves the instruction into deferred buffer 112. Note that like instruction buffer 108, deferred buffer 112 is also organized as a FIFO buffer.

When the data dependency is eventually resolved, instructions from deferred buffer 112 are executed in program order with respect to other deferred instructions, but not with respect to other previously executed non-deferred instructions.

State Diagram

Figure 2:
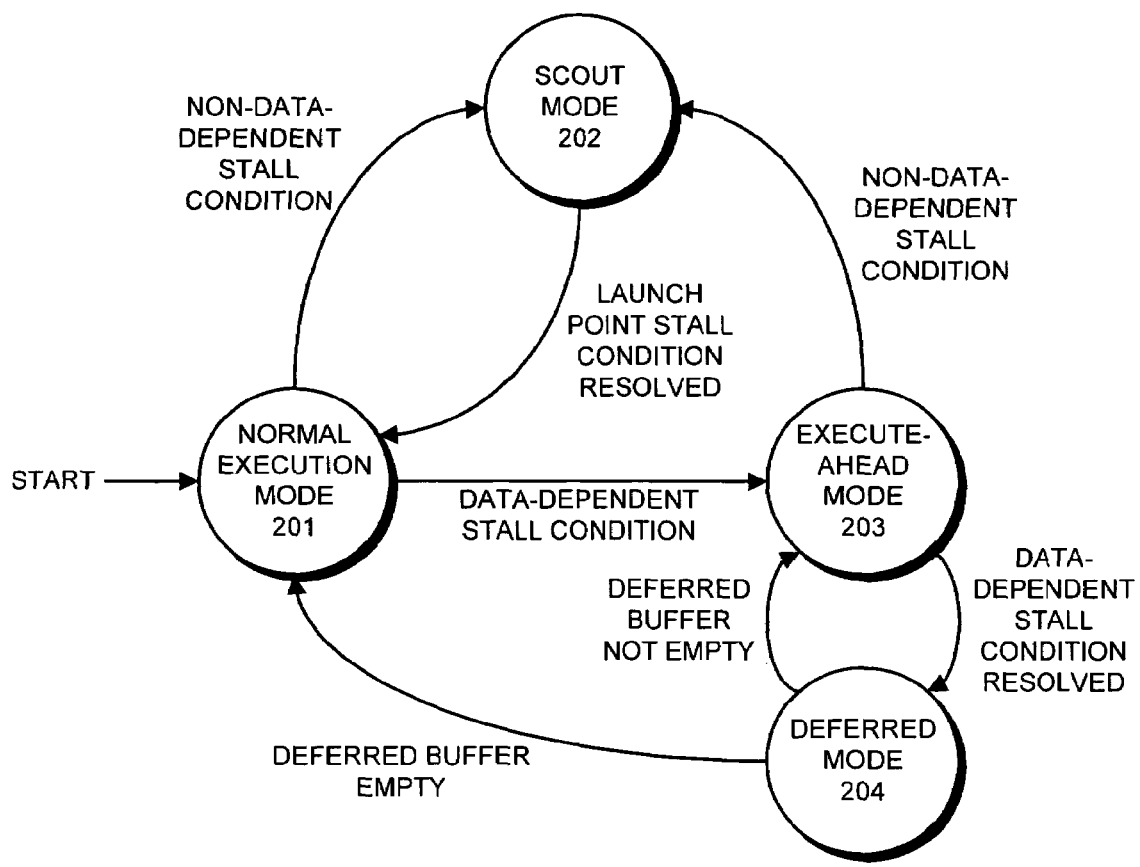
FIG. 2 presents a state diagram which includes a general depiction of execute-ahead mode, scout mode, and deferred mode in accordance with an embodiment of the present invention.

FIG. 2 presents a state diagram which includes a general depiction of execute-ahead mode 203, scout mode 202, and deferred mode 204 in accordance with an embodiment of the present invention.

The processor starts in normal-execution mode 201, wherein instructions are executed in program order as they are issued from instruction buffer 108 (see FIG. 1).

Next, if an unresolved data dependency arises during execution of an instruction, the processor moves to execute-ahead mode 203. An unresolved data dependency can include: a use of an operand that has not returned from a preceding load miss; a use of an operand that has not returned from a preceding translation lookaside buffer miss; a use of an operand that has not returned from a preceding full or partial read-after-write from store buffer operation; and a use of an operand that depends on another operand that is subject to an unresolved data dependency.

While moving to execute-ahead mode 203, the processor generates a checkpoint that can be used, if necessary, to return execution of the process to the point where the unresolved data dependency was encountered; this point is referred to as the "launch point." (Generating the checkpoint involves saving the precise architectural state of processor 100 to facilitate subsequent recovery from exceptions that arise during execute-ahead mode 203 or deferred mode 204.) The processor also "defers" execution of the instruction that encountered the unresolved data dependency by storing the instruction in deferred buffer 112.

While operating in execute-ahead mode 203, the processor continues to execute instructions in program order as they are received from instruction buffer 108, and any instructions that cannot execute because of an unresolved data dependency are deferred into deferred buffer 112.

During execute-ahead mode 203, if an unresolved data dependency is finally resolved, the processor moves into deferred mode 204, wherein the processor attempts to execute instructions from deferred buffer 112 in program order. Note that the processor attempts to execute these instructions in program order with respect to other deferred instructions in deferred buffer 112, but not with respect to other previously executed non-deferred instructions (and not with respect to deferred instructions executed in previous passes through deferred buffer 112). During this process, the processor defers execution of deferred instructions that still cannot be executed because of unresolved data dependencies by placing these again-deferred instruction back into deferred buffer 112. On the other hand, the processor executes other instructions that can be executed in program order with respect to each other.

After the processor completes a pass through deferred buffer 112, if deferred buffer 112 is empty, the processor moves back into normal-execution mode 201. This may involve committing changes made during execute-ahead mode 203 and deferred mode 204 to the architectural state of processor 100, if such changes have not been already committed. The return to normal mode can also involve throwing away the checkpoint generated when the processor moved into execute-ahead mode 203.

On the other hand, if deferred buffer 112 is not empty after the processor completes a pass through deferred buffer 112, the processor returns to execute-ahead mode 203 to execute instructions from instruction buffer 108 from the point where the execute-ahead mode 203 left off.

If a non-data dependent stall condition (except for a load buffer full or store buffer full condition) arises while the processor is in normal-execution mode 201 or in execute-ahead mode 203, the processor moves into scout mode 202. (This non-data-dependent stall condition can include: a memory barrier operation; or a deferred buffer full condition.) In scout mode 202, instructions are speculatively executed to prefetch future loads, but results are not committed to the architectural state of processor 100.

Scout mode 202 is described in more detail in a pending U.S. patent application entitled, "Generating Prefetches by Speculatively Executing Code Through Hardware Scout Threading," by inventors Shailender Chaudhry and Marc Tremblay, having Ser. No. 10/741,944, and filing date 19 Dec. 2003, which is hereby incorporated by reference to describe implementation details of scout mode 202.

Unfortunately, computational operations performed during scout mode 202 need to be recomputed again, which can require a large amount of computational work.

When the original "launch point" stall condition is finally resolved, the processor moves back into normal-execution mode 201, and, in doing so, uses the previously generated checkpoint to resume execution from the launch point instruction that encountered the launch point stall condition. The launch point stall condition is the stall condition that originally caused the processor to move out of normal-execution mode 201. For example, the launch point stall condition can be the data-dependent stall condition that caused the processor to move from normal-execution mode 201 to execute-ahead mode 203, before moving to scout mode 202. Alternatively, the launch point stall condition can be the non-data-dependent stall condition that caused the processor to move directly from normal-execution mode 201 to scout mode 202.

Deferred Buffer and Long-Latency Scoreboard Example

Figure 3A:
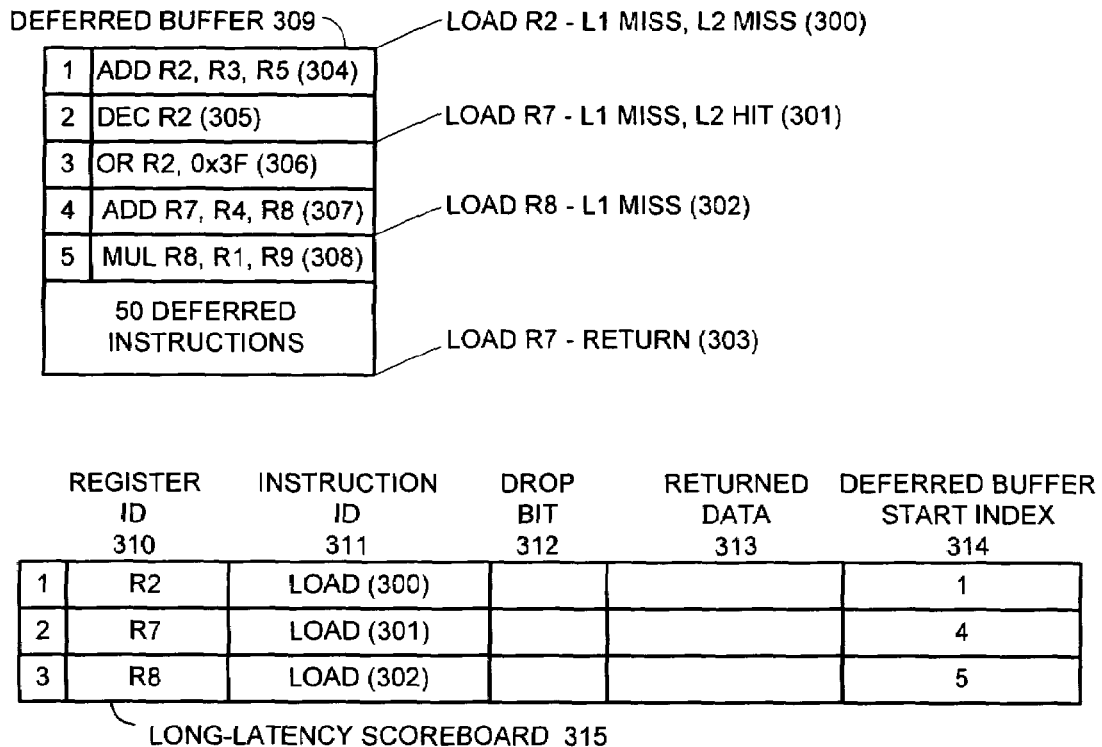
FIG. 3A illustrates a deferred buffer and a long-latency scoreboard following an initial sequence of instructions in normal-execution mode in accordance with an embodiment of the present invention.
Figure 3B:
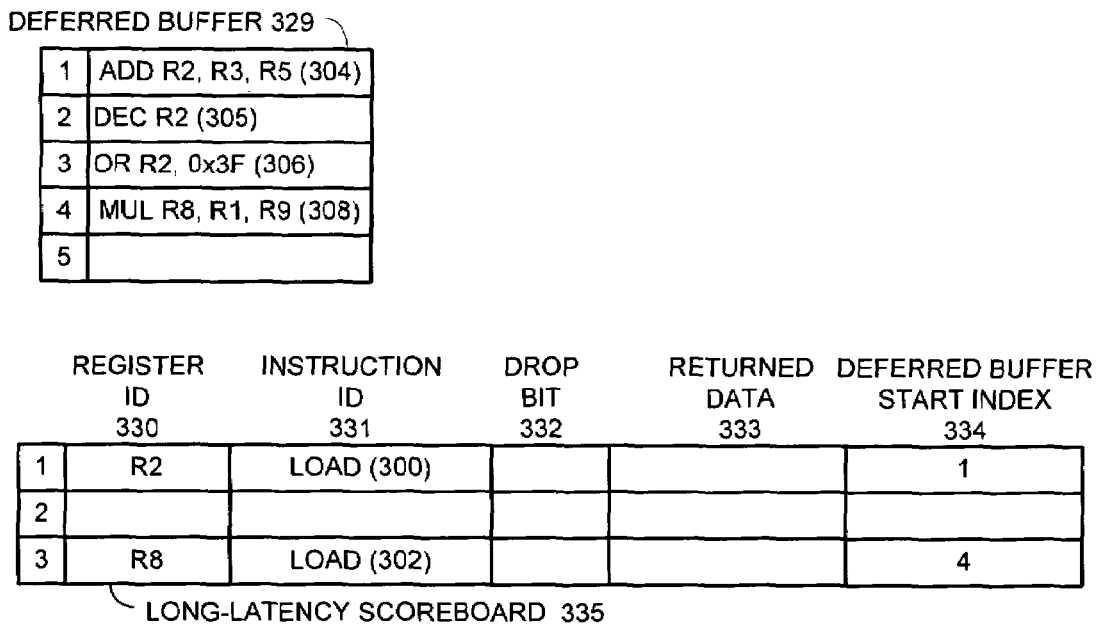
FIG. 3B illustrates a deferred buffer and long-latency scoreboard after the processor has completed a pass through the deferred buffer in deferred mode in accordance with an embodiment of the present invention.

We now present an example of how the deferred buffer and the long-latency scoreboard operate in accordance with an embodiment of the present invention. More specifically, FIG. 3A illustrates a deferred buffer and a long-latency scoreboard following an initial sequence of instructions in normal-execution mode and FIG. 3B illustrates a deferred buffer and long-latency scoreboard after the processor has completed a pass through the deferred buffer in deferred mode.

When processor 100 (see FIG. 1) is executing instructions and encounters a long-latency operation, such as a load instruction that misses in the L1 cache that must be sent to L2 cache or system memory, processor 100 writes information about the instruction to long-latency scoreboard 315. Using this information, processor 100 tracks the long-latency operation for subsequent dependent instructions.

For each long-latency operation, long-latency scoreboard 315 contains register ID 310, instruction ID 311, drop bit 312, and returned data 313. Register ID 310 identifies the instruction's destination register. Instruction ID 311 identifies the instruction which generated the long-latency operation recorded in long-latency scoreboard 315. Drop bit 312 facilitates dropping data from the long-latency scoreboard, but keeping an entry for trap handling purposes, and returned data 313 holds the data from the memory system when the long-latency operation returns.

Along with the other fields, long-latency scoreboard 315 holds deferred buffer start index 314 which contains a numerical offset that indicates a position within deferred buffer 309. This position is the location of the first deferred instruction that is dependent on the long-latency operation that wrote the entry into long-latency scoreboard 315. When the long-latency operation returns, processor 100 begins executing deferred instructions at the position indicated by deferred buffer start index 314.

By starting execution of deferred instructions using deferred buffer start index 314, processor 100 skips over deferred instructions which still have unresolved dependencies. These skipped instructions would normally be issued from deferred buffer 309 and would immediately be re-deferred, thereby needlessly occupying processor 100 resources.

Note that, once execution starts with deferred buffer start index 314, processor 100 must make a pass all the way through deferred buffer 309.

Also note that processor 100 initializes deferred buffer start index 314 for each entry to the highest possible value. In this way, when the first instruction with a dependency on the long-latency operation enters deferred buffer 309 (no matter where in deferred buffer 309 the instruction enters) processor 100 updates deferred buffer start index 314 because the deferred buffer count of the position where the instruction enters the deferred buffer is always lower than the highest possible value.

Furthermore, note that processor 100 subsequently updates deferred buffer start index 314 only when a dependent deferred instruction is placed in deferred buffer 309 in a position closer to the start of deferred buffer 309 than deferred buffer start index 314 already indicates.

Referring to FIG. 3A, processor 100 initially issues LOAD R2 300, which misses in the L1 cache and must go to system memory. Processor 100 then enters LOAD R2 300 into long-latency scoreboard 315 at position 1 and initializes position 1's deferred buffer start index to the highest possible value.

Next, processor 100 issues ADD 304. Since ADD 304 depends on register R2, which is unresolved, processor 100 updates the deferred buffer count to 1 and defers the instruction into position 1 of deferred buffer 309. Note that processor 100 employs the deferred buffer count to record the current position for storing instructions within the deferred buffer. Initially, the deferred buffer count is set to 0 and before each instruction is entered into the deferred buffer, the count is incremented.

As part of the deferral process, processor 100 performs a CAM lookup for long-latency operations affecting register R2 in long-latency scoreboard 315. Since position 1 of long-latency scoreboard 315 is a load to register R2, processor 100 compares position 1's deferred buffer start index to the deferred buffer count. Because the deferred buffer count of 1 is lower than the highest possible value already stored in position 1's deferred buffer start index, processor 100 updates the position 1's deferred buffer start index to 1.

Next, processor 100 issues DEC 305. Because DEC 305 has an unresolved dependency on register R2, processor 100 updates the deferred buffer count to 2 and defers the instruction. Processor 100 then performs a CAM lookup for a long-latency operations affecting register R2 in long-latency scoreboard 315. Although processor 100 finds a match in position 1 of long-latency scoreboard 315, processor 100 does not update position 1's deferred buffer start index because the deferred buffer count of 2 is higher than position 1's deferred buffer start index of 1.

Next, LOAD R7 301 issues. LOAD R7 301 misses in the L1 cache and processor 100 adds LOAD R7 301 to long-latency scoreboard 315 in position 2 and initializes position 2's deferred buffer start index to the highest possible value.

Processor 100 next issues OR 306. Because OR 306 has an unresolved dependency on register R2, processor 100 increments the deferred buffer count to 3 and defers the instruction. Processor 100 then performs a CAM lookup searching for long-latency operations affecting register R2 in long-latency scoreboard 315. However, processor 100 does not update position 1's deferred buffer start index because the deferred buffer count of 3 is higher than the position 1's deferred buffer start index of 1.

Next, processor 100 issues ADD 307. Because ADD 307 has an unresolved dependency on register R7, processor 100 updates the deferred buffer count to 4 and defers the instruction. As ADD 307 is deferred, processor 100 performs a CAM lookup for long-latency operations affecting register R7 in long-latency scoreboard 315. Because position 2 of long-latency scoreboard 315 is a load to a register R7, processor 100 compares position 2's deferred buffer start index to the deferred buffer count. The deferred buffer count of 4 is lower than the highest possible value already stored in the position 2's deferred buffer start index; accordingly, processor 100 updates position 2's deferred buffer start index to 4.

Processor 100 next issues LOAD R8 302, which misses in the L1 cache. Processor 100 writes LOAD R8 302 to position 3 of long-latency scoreboard 315 and initializes position 3's deferred buffer start index to the highest possible value.

Processor 100 then issues MUL 308. Because MUL 308 has an unresolved data dependency on register R8, processor 100 updates the deferred buffer count to 5 and defers the instruction. As the MUL 308 instruction is deferred, processor 100 performs a CAM lookup for long-latency operations affecting register R8 or register R1 in long-latency scoreboard 315. Since position 3 of long-latency scoreboard 315 is a load to a register R8, processor 100 compares position 3's deferred buffer start index to the deferred buffer count. The deferred buffer count of 5 is lower than the highest possible value that is already stored in position 3's deferred buffer start index; hence, processor 100 updates the position 3's deferred buffer start index to 5.

Processor 100 next issues and defers 50 instructions with unresolved dependencies on register R7. Since ADD 307 already updated position 2's deferred buffer start index, processor 100 does not update the position 2's deferred buffer start index during the deferral of these instructions.

Next, LOAD R7 303 returns from the miss on LOAD R7 301. As LOAD R7 303 returns, processor 100 removes the LOAD R7 301 from position 2 of long-latency scoreboard 315, as shown in long-latency scoreboard 335 (see FIG. 3B). Processor 100 then uses position 2's deferred buffer start index to modify the deferred buffer count to 4.

Processor 100 next enters deferred mode and begins to execute deferred instructions from deferred buffer 309, starting at position 4. In doing so, processor 100 issues and executes ADD R7.

Next, processor 100 issues MUL 308. MUL 308 depends on LOAD R8 302 and therefore cannot execute because LOAD R8 302 is pending. Consequently, processor 100 re-defers MUL 308, placing MUL 308 in the deferred buffer in the location indicated by the deferred buffer count of 4 as shown in deferred buffer 329 (see FIG. 3B).

While re-deferring MUL 308, processor 100 performs a CAM lookup on long-latency scoreboard 315 for a long-latency operations affecting registers R8 or register R1. Since position 3 of long-latency scoreboard 315 is a load to a register R8, processor 100 compares position 3's deferred buffer start index to the current deferred buffer count of 4. The deferred buffer count of 4 is lower than position 3's deferred buffer start index of 5 and processor 100 updates position 3's deferred buffer start index as shown in deferred buffer 335.

Processor 100 then issues the next 50 deferred instructions in deferred buffer 309. These instructions all successfully execute.

Placing Dependent Instructions in the Deferred Buffer

Figure 4:
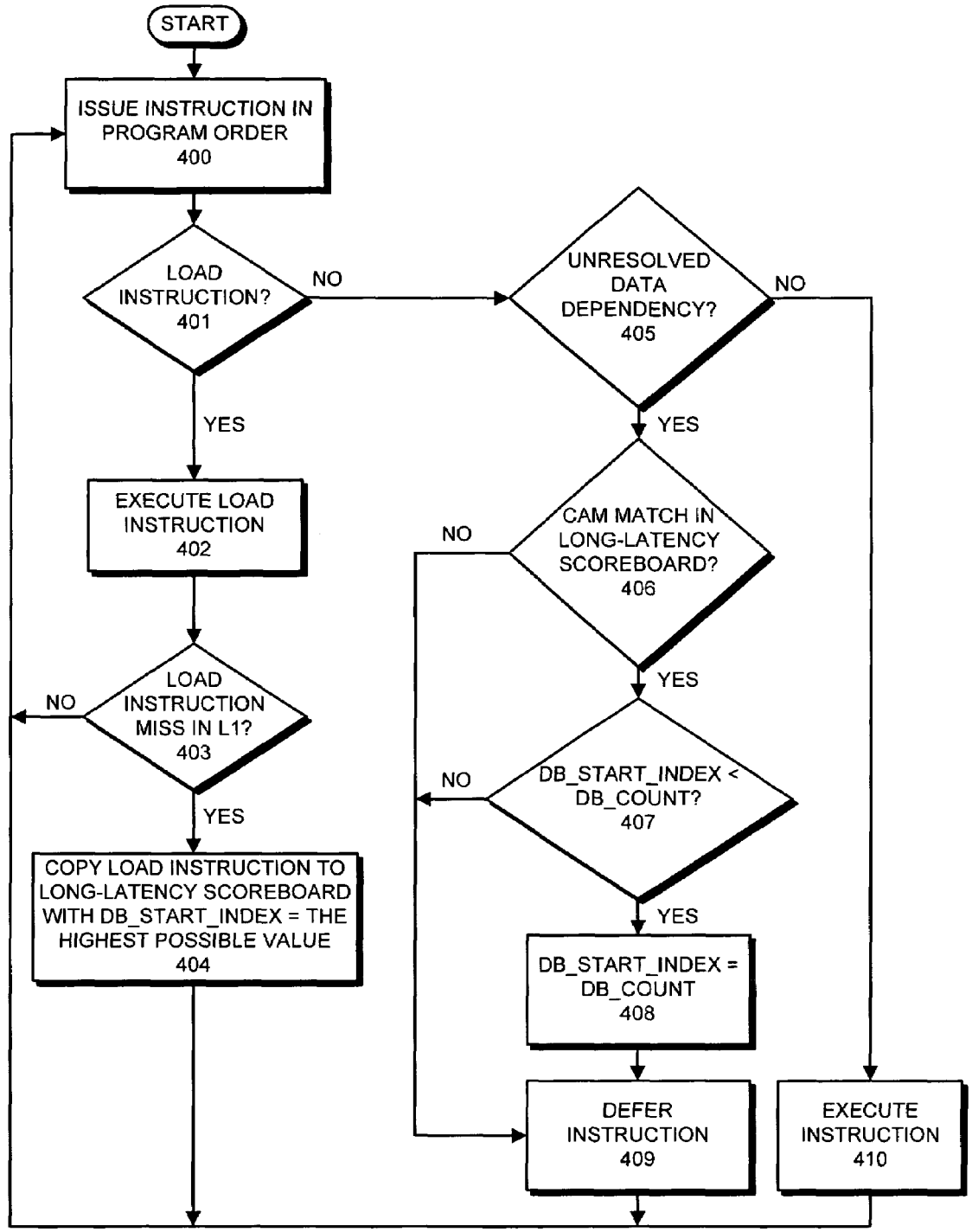
FIG. 4 presents a flow chart illustrating the process of entering a long-latency operation instruction into the long-latency scoreboard and updating the deferred buffer start index for the entry in accordance with an embodiment of the present invention.

FIG. 4 presents a flow chart illustrating the process of entering a long-latency operation instruction into the long-latency scoreboard and updating the deferred buffer start index for the entry in accordance with an embodiment of the present invention. Note that for this example, the long-latency operation is a load operation. The process starts when processor 100 (see FIG. 1) issues an instruction in program order (step 400).

Processor 100 determines whether the instruction is a load instruction (step 401). If the instruction is a load instruction, processor 100 executes the load (step 402).

Processor 100 then determines whether or not the load instruction missed in the L1 cache (step 403). If processor 100 determines that the load hit in the L1 cache (step 403), processor 100 returns to step 400 and issues the next instruction in program order.

If the load instruction misses in the L1 cache, processor 100 adds information about the load to the long-latency scoreboard (step 404). Entries in the long-latency scoreboard include the deferred buffer start index, which processor 100 initializes to a highest possible value (step 404). Processor 100 then returns to step 400 and issue the next instruction in program order.

If the initially issued instruction is not a load instruction, processor 100 then determines if the instruction has an unresolved data dependency (step 405). When an instruction is found that has no unresolved data dependencies, processor 100 executes the instruction (step 410). Processor 100 then returns to step 400 and issues the next instruction in program order.

Alternatively, if the instruction has an unresolved data dependency, processor 100 performs a CAM lookup on the long-latency scoreboard to determine if the instruction's input operands have an outstanding load in the long-latency scoreboard (step 406). If there are no matching loads in the long-latency scoreboard, processor 100 defers the instruction. Processor 100 then returns to step 400 and issues the next instruction in program order.

If there is a matching load in the long-latency scoreboard, processor 100 compares deferred buffer start index (db_start_index) for the load to the deferred buffer count (db_count) (step 407). When processor 100 determines that the db_start_index is higher than the db_count, processor 100 replaces the value in db_start_index with the value in db_count (step 408). Processor 100 then defers the instruction (step 409). After deferring the instruction, processor 100 returns to step 400 and issues the next instruction in program order.

On the other hand, if processor 100 determines that the db_start_index is lower than db_count, processor 100 defers the instruction without updating the db_count value. Processor 100 then returns to step 400 and issue the next instruction in program order.

Executing Deferred Instructions Using the Deferred Buffer Start Index

Figure 5:
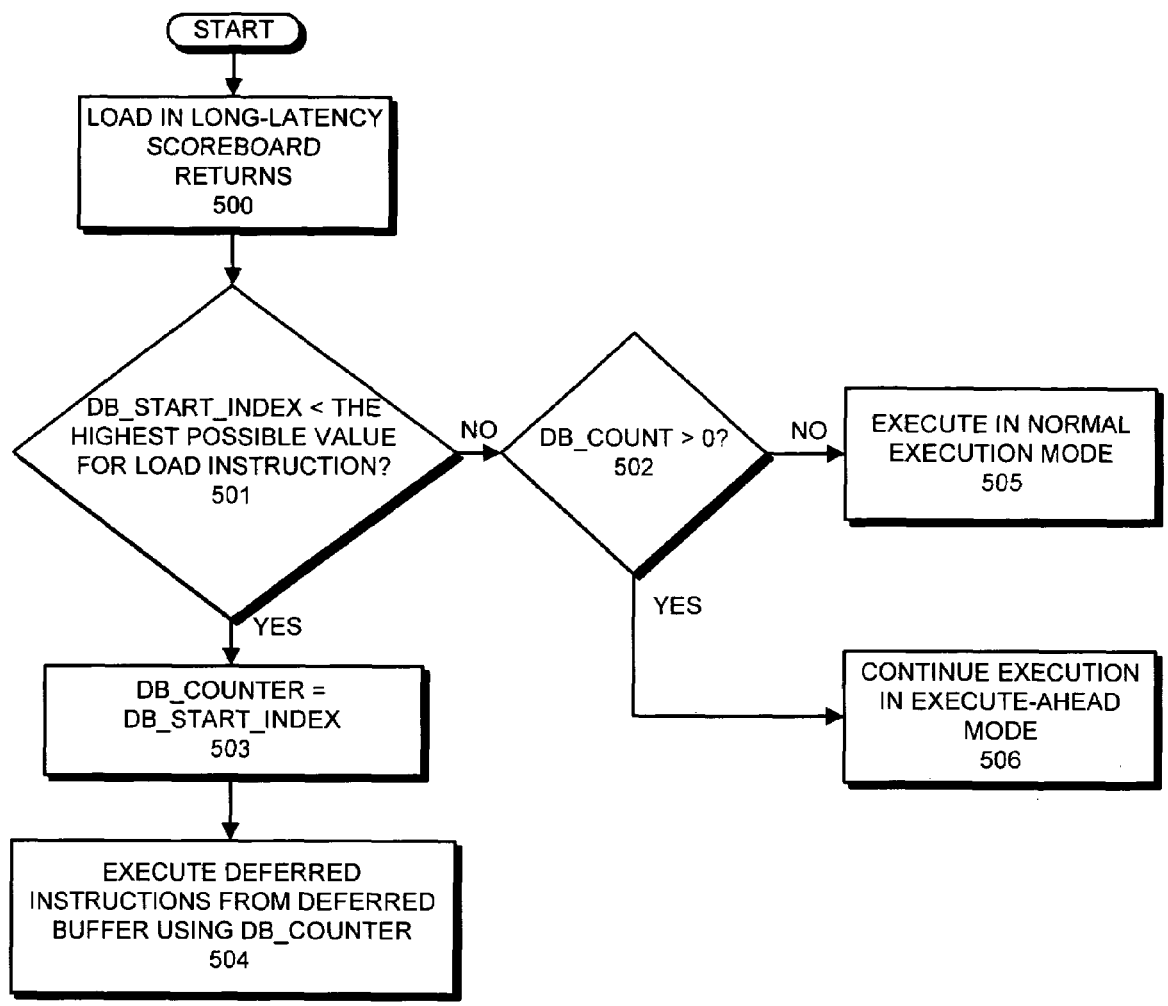
FIG. 5 presents a flow chart illustrating the process of selectively replaying instructions following the return of a long-latency operation after speculative-execution in accordance with an embodiment of the present invention.

FIG. 5 presents a flow chart illustrating the process of selectively replaying instructions following the return of a long-latency operation after speculative-execution in accordance with an embodiment of the present invention. The process starts with the return of a long-latency operation, in this case a load instruction, which is recorded in the long-latency scoreboard (step 500).

Processor 100 determines if deferred buffer start index (db_start_index) for the load instruction is less than the highest possible value (step 501). Since the db_start_index is initialized to the highest possible value, any value less than the highest possible value indicates that there is a position in deferred buffer 112 with a dependency on this load. If the db_start_index is still set to the highest possible value, processor 100 determines whether or not the deferred buffer count (db_count) has a value greater than zero (step 502). If the db_count is greater than zero, deferred buffer 112 must contain deferred instructions and processor 100 continues execution in execute-ahead mode (step 506). If the db_count is zero, there are no instructions in deferred buffer 112 and processor 100 executes instructions in normal-execution mode.

Otherwise, if the db_start_index is less than the highest possible value, an instruction within deferred buffer 112 is dependent on the returning load. Processor 100 therefore sets the db_count to the value in the db_start_index. Then processor 100 enters deferred mode and begins executing instructions in deferred buffer 112 starting with the position indicated by the db_count.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for selectively executing deferred instructions following a return of a long-latency operation in a processor that supports speculative-execution, comprising:
issuing instructions for execution in program order during a normal-execution mode;
when a long-latency operation is encountered, recording the long-latency operation in a long-latency scoreboard wherein each position in the long-latency scoreboard includes a deferred buffer start index;
upon encountering an unresolved data dependency during execution of an instruction, performing a checkpointing operation and executing subsequent instructions in an execute-ahead mode, wherein instructions that cannot be executed because of the unresolved data dependency are deferred into a deferred buffer, and wherein other non-deferred instructions are executed in program order,
upon encountering a deferred instruction that depends on a long-latency operation within the long-latency scoreboard, updating the deferred buffer start index associated with the long-latency operation to point to position in the deferred buffer occupied by the deferred instruction; and
when a long-latency operation returns, executing instructions in the deferred buffer starting at the deferred buffer start index for the returning long-latency operation.

2. The method of claim 1, wherein the processor initializes the deferred buffer start index associated with each entry in the long-latency scoreboard to a highest possible value.

3. The method of claim 1, wherein the processor updates the value for the deferred buffer start index for a long-latency operation in the long-latency scoreboard when the processor stores a dependent instruction in the deferred buffer in a position closer to the start of the deferred buffer than the existing value for the deferred buffer start index indicates.

4. The method of claim 1, wherein deferred instructions perform a content addressable memory (CAM) lookup in the long-latency scoreboard to identify long-latency operations for one or more operands required by the deferred instruction.

5. The method of claim 1, further comprising maintaining a deferred buffer count which indicates where in the deferred buffer the last deferred instruction was stored.

6. The method of claim 1, wherein, when beginning execution of deferred instructions following the return of a long-latency operation, the deferred instruction counter is reset to the position of the deferred buffer start index associated with the long-latency operation.

7. The method of claim 1, wherein executing deferred instructions in the deferred mode involves:
issuing deferred instructions for execution in program order;
re-deferring execution of deferred instructions that still cannot be executed because of unresolved data dependencies; and
executing other deferred instructions that are able to be executed in program order.

8. The method of claim 7, wherein the method further comprises re-deferring instructions into the deferred buffer starting at the location specified by the deferred buffer start index.

9. The method of claim 8, wherein when instructions are re-deferred, the method further comprises performing a CAM lookup in the long-latency scoreboard to identify long-latency operations for one or more operands required by the deferred instruction and, if necessary, updating the deferred buffer start index.

10. The method of claim 7, wherein if some deferred instructions are deferred again, the method further comprises returning to execute-ahead mode at the point where execute-ahead mode left off.

11. An apparatus for selectively executing deferred instructions following a return of a long-latency operation in a processor that supports speculative-execution, comprising:
a processor;
an execution mechanism within the processor that is configured to issue instructions for execution in program order during a normal-execution mode;
wherein when a long-latency operation is encountered, the execution mechanism is configured to record the long-latency operation in a long-latency scoreboard wherein each position in the long-latency scoreboard includes a deferred buffer start index;
wherein upon encountering an unresolved data dependency during execution of an instruction, the execution mechanism is configured to perform a checkpointing operation and execute subsequent instructions in an execute-ahead mode, wherein instructions that cannot be executed because of the unresolved data dependency are deferred into a deferred buffer, and wherein other non-deferred instructions are executed in program order,
wherein upon encountering a deferred instruction that depends on a long-latency operation within the long-latency scoreboard, the execution mechanism is configured to update the deferred buffer start index associated with the long-latency operation to point to position in the deferred buffer occupied by the deferred instruction; and
wherein when a long-latency operation returns, the execution mechanism is configured to execute all of the instructions in the deferred buffer starting at the deferred buffer start index for the returning long-latency operation.

12. The apparatus of claim 11, wherein execution mechanism is configured such that the deferred buffer start index associated with each entry in the long-latency scoreboard is initialized to a highest possible value.

13. The apparatus of claim 11, wherein the execution mechanism is configured such that the deferred buffer start index for a long-latency operation in the long-latency scoreboard is only updated when a deferred instruction which depends on the long-latency operation enters the deferred buffer in a position closer to the start of the deferred buffer than the existing deferred buffer start index indicates.

14. The apparatus of claim 11, wherein the execution mechanism is configured such that the deferred instructions perform a content addressable memory (CAM) lookup in the long-latency scoreboard to identify long-latency operations for one or more operands required by the deferred instruction.

15. The apparatus of claim 11, wherein the execution mechanism is configured such to maintain a deferred buffer count which indicates where in the deferred buffer the last deferred instruction was stored.

16. The apparatus of claim 11, wherein, when beginning execution of deferred instructions following the return of a long-latency operation, the execution mechanism is configured such to reset a deferred instruction counter to the position of the deferred buffer start index associated with the long-latency operation.

17. The apparatus of claim 11, wherein while executing deferred instructions in the deferred mode, the execution mechanism is configured to:
issuing deferred instructions for execution in program order;
deferring execution of deferred instructions that still cannot be executed because of unresolved data dependencies; and
executing other deferred instructions that are able to be executed in program order.

18. The apparatus of claim 17, wherein the execution mechanism is configured to re-defer instructions into the deferred buffer starting at the location specified by the deferred buffer start index.

19. The apparatus of claim 18, wherein when instructions are re-deferred, the execution mechanism is configured to perform a CAM lookup in the long-latency scoreboard to identify long-latency operations for one or more operands required by the deferred instruction and, if necessary, updating the deferred buffer start index.

20. The apparatus of claim 17, wherein if some deferred instructions are deferred again, the execution mechanism is configured to return to execute-ahead mode at the point where execute-ahead mode left off.

21. A computer system for selectively executing deferred instructions following a return of a long-latency operation in a processor that supports speculative-execution, comprising:
a memory;
a processor;
an execution mechanism within the processor which is configured to issue instructions for execution in program order during a normal-execution mode;
wherein when a long-latency operation is encountered, the execution mechanism is configured to record the long-latency operation in a long-latency scoreboard wherein each position in the long-latency scoreboard includes a deferred buffer start index;
wherein upon encountering an unresolved data dependency during execution of an instruction, the execution mechanism is configured to perform a checkpointing operation and execute subsequent instructions in an execute-ahead mode, wherein instructions that cannot be executed because of the unresolved data dependency are deferred into a deferred buffer, and wherein other non-deferred instructions are executed in program order,
wherein upon encountering a deferred instruction that depends on a long-latency operation within the long-latency scoreboard, the execution mechanism is configured to update the deferred buffer start index associated with the long-latency operation to point to position in the deferred buffer occupied by the deferred instruction; and
wherein when a long-latency operation returns, the execution mechanism is configured to execute instructions in the deferred buffer starting at the deferred buffer start index for the returning long-latency operation.

* * * * *